United States Patent
Tsukamoto

(10) Patent No.: US 11,239,704 B2
(45) Date of Patent: Feb. 1, 2022

(54) ELECTRONIC APPARATUS, WIRELESS POWER SUPPLY SYSTEM, AND CONTROL METHODS THEREOF

(71) Applicant: CANON KABUSHIKI KAISHA, Tokyo (JP)

(72) Inventor: Nobuyuki Tsukamoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 130 days.

(21) Appl. No.: 16/160,036

(22) Filed: Oct. 15, 2018

(65) Prior Publication Data
US 2019/0121401 A1 Apr. 25, 2019

(30) Foreign Application Priority Data

Oct. 20, 2017 (JP) .............................. JP2017-203701

(51) Int. Cl.
*H02J 50/60* (2016.01)
*H04B 5/00* (2006.01)

(52) U.S. Cl.
CPC ............ *H02J 50/60* (2016.02); *H04B 5/0037* (2013.01)

(58) Field of Classification Search
CPC .... H02J 50/60; H02J 7/00034; H04B 5/0037; G06F 1/1698; G06F 1/1635; G06F 1/26
See application file for complete search history.

(56) References Cited

U.S. PATENT DOCUMENTS

| | | | |
|---|---|---|---|
| 10,084,320 B2 * | 9/2018 | Tanabe | H02J 7/025 |
| 2016/0087454 A1 * | 3/2016 | Tanabe | H02J 7/00045 307/104 |
| 2017/0141604 A1 * | 5/2017 | Park | H04B 5/0031 |
| 2018/0097392 A1 * | 4/2018 | Grange | H02J 50/10 |
| 2018/0131243 A1 * | 5/2018 | Hamaguchi | H02J 50/80 |
| 2018/0351369 A1 * | 12/2018 | Lee | H02J 7/025 |

FOREIGN PATENT DOCUMENTS

| | | |
|---|---|---|
| JP | 2008-113519 A | 5/2008 |
| JP | 2016-067066 A | 4/2016 |

OTHER PUBLICATIONS

The above foreign patent document was cited in the Sep. 24, 2021 Japanese Office Action, that issued in Japanese Patent Application No. 2017-203701.

* cited by examiner

*Primary Examiner* — Daniel Cavallari
(74) *Attorney, Agent, or Firm* — Cowan, Liebowitz & Latman, P.C.

(57) ABSTRACT

An electronic apparatus includes: a communication unit that communicates with another electronic apparatus in a non-contacting manner; and a power supply unit that supplies power to the other electronic apparatus in the non-contacting manner. When a power-supply target electronic apparatus is detected through a first polling performed by the communication unit, the electronic apparatus notifies the power-supply target electronic apparatus of the start of foreign object detection processing. After this notification, the electronic apparatus executes the foreign object detection processing to detect the presence of a foreign object that is not a power supply target through a second polling performed for a predetermined period by the communication unit. Based on a result of the foreign object detection processing, the electronic apparatus controls power supply from the power supply unit to the power-supply target electronic apparatus.

13 Claims, 10 Drawing Sheets

ELECTRONIC APPARATUS, WIRELESS POWER SUPPLY SYSTEM, AND CONTROL METHODS THEREOF

BACKGROUND OF THE INVENTION

Field of the Invention

The present invention relates to an electronic apparatus that performs power transfer and communication in a non-contacting manner, a wireless power supply system, and control methods thereof.

Description of the Related Art

In recent years, a wireless power supply system is known which includes a power supply apparatus that supplies power in a non-contacting manner without cable connection and an electronic apparatus that receives power supplied from the power supply apparatus in the non-contacting manner. It is known that a power supply apparatus in such a wireless power supply system uses the same single antenna both for data communication to transmit a command to an electronic apparatus and for power transfer to the electronic apparatus (see Japanese Patent Laid-Open No. 2008-113519).

When an electronic apparatus other than the electronic apparatus that is a power transfer target is detected through communication before the start of power supply, the power supply apparatus in the wireless power supply system restricts or stops the power supply output in order not to adversely affect the electronic apparatus that is not a power transfer target. However, when both an electronic apparatus that is the power transfer target and an electronic apparatus that is not the power transfer target (hereinafter, referred to as a foreign object) are present near the power supply apparatus, the power supply apparatus cannot detect the foreign object in some cases because communication with this electronic apparatus that is not the power transfer target is unavailable. The execution of power transfer in the presence of the foreign object can possibly cause adverse effects, such as damage to the foreign object and decrease in power transfer efficiency. In particular, when the power supply apparatus uses the same single antenna both for data communication and for power transfer, the electronic apparatus having no power receiving function may disadvantageously receive an excessive amount of power via the antenna used for data communication.

SUMMARY OF THE INVENTION

According to an embodiment of the present invention, the accuracy with which an electronic apparatus on the power supply side detects, before the start of power supply, the presence of a foreign object that is not a power transfer target can be increased.

According to one aspect of the present invention, there is provided an electronic apparatus that includes: a communication unit that communicates with an other electronic apparatus in a non-contacting manner; and a power supply unit that supplies power to the other electronic apparatus in the non-contacting manner, the electronic apparatus comprising: a notification unit configured to, when a power-supply target electronic apparatus is detected through a first polling performed by the communication unit, provide a notification to notify the power-supply target electronic apparatus of a start of foreign object detection processing; an execution unit configured to, after the notification unit provides the notification, execute the foreign object detection processing to detect a presence of a foreign object that is not a power supply target through a second polling performed for a predetermined period by the communication unit; and a control unit configured to control power supply from the power supply unit to the power-supply target electronic apparatus, based on a result of the foreign object detection processing.

According to another aspect of the present invention, there is provided an electronic apparatus, comprising: a power receiving unit configured to receive power from an external electronic apparatus via an antenna in a non-contacting manner; a communication unit configured to communicate with the external electronic apparatus in the non-contacting manner; a switching unit configured to switch between a connection state and a disconnection state between the antenna of the power receiving unit and a load side; and a control unit configured to cause the switching unit to switch to the disconnection state for a predetermined period when receiving a predetermined notification from the external electronic apparatus via the communication unit.

According to another aspect of the present invention, there is provided a control method of an electronic apparatus that includes: a communication unit that communicates with an other electronic apparatus in a non-contacting manner; and a power supply unit that supplies power to the other electronic apparatus in the non-contacting manner, the control method comprising: notifying, when a power-supply target electronic apparatus is detected through a first polling performed by the communication unit, the power-supply target electronic apparatus of a start of foreign object detection processing; executing, after the notifying, the foreign object detection processing to detect a presence of a foreign object that is not a power supply target through a second polling performed for a predetermined period by the communication unit; and controlling power supply from the power supply unit to the power-supply target electronic apparatus, based on a result of the foreign object detection processing.

According to another aspect of the present invention, there is provided a control method of an electronic apparatus that includes: a power receiving unit that receives power from an external electronic apparatus via an antenna in a non-contacting manner; a communication unit that communicates with the external electronic apparatus in the non-contacting manner; and a switching unit that switches between a connection state and a disconnection state between the antenna of the power receiving unit and a load side, the control method comprising causing the switching unit to switch to the disconnection state for a predetermined period when a predetermined notification is received from the external electronic apparatus via the communication unit.

According to another aspect of the present invention, there is provided a non-transitory computer-readable storage medium storing a computer program for causing a computer to execute a control method of an electronic apparatus that includes: a communication unit that communicates with an other electronic apparatus in a non-contacting manner; and a power supply unit that supplies power to the other electronic apparatus in the non-contacting manner, the control method comprising: notifying, when a power-supply target electronic apparatus is detected through a first polling performed by the communication unit, the power-supply target electronic apparatus of a start of foreign object detection processing; executing, after the notifying, the foreign object detection processing to detect a presence of a foreign object that is not a power supply target through a second polling performed for a predetermined period by the communication unit; and controlling power supply from the power supply unit to the power-supply target electronic apparatus, based on a result of the foreign object detection processing.

According to another aspect of the present invention, there is provided a non-transitory computer-readable storage medium storing a computer program for causing a computer to execute a control method of an electronic apparatus that includes: a power receiving unit that receives power from an external electronic apparatus via an antenna in a non-contacting manner; a communication unit that communicates with the external electronic apparatus in the non-contacting manner; and a switching unit that switches between a connection state and a disconnection state between the antenna of the power receiving unit and a load side, the control method comprising causing the switching unit to switch to the disconnection state for a predetermined period when a predetermined notification is received from the external electronic apparatus via the communication unit.

Further features of the present invention will become apparent from the following description of exemplary embodiments (with reference to the attached drawings).

DESCRIPTION OF THE EMBODIMENTS

The following is a description of an exemplary embodiment according to the present invention, with reference to the drawings.

Figure 1:
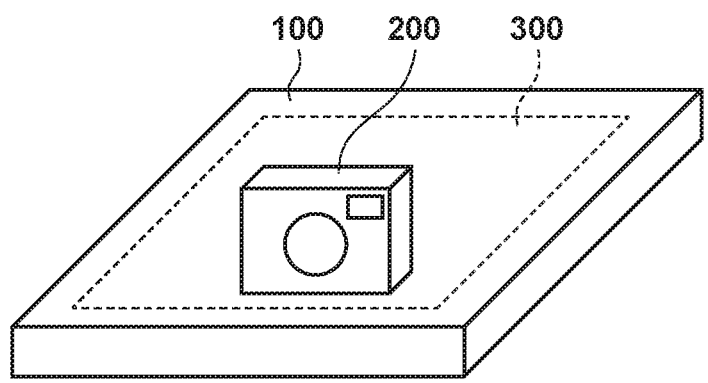
FIG. 1 is a diagram showing an example of a wireless power supply system according to an embodiment.

As shown in FIG. 1, a wireless power supply system 10 includes: a power supply apparatus 100 as an electronic apparatus that supplies power in a non-contacting manner and a power receiving apparatus 200 as an electronic apparatus that receives power in the non-contacting manner. When the power receiving apparatus 200 is present in a predetermined range 300 of the power supply apparatus 100 in the wireless power supply system 10, the power supply apparatus 100 wirelessly supplies power to the power receiving apparatus 200. Moreover, when the power receiving apparatus 200 is present in the predetermined range 300, the power receiving apparatus 200 can wirelessly receive power output from the power supply apparatus 100. When the power receiving apparatus 200 is absent from the predetermined range 300, the power receiving apparatus 200 cannot wirelessly receive power output from the power supply apparatus 100. It should be noted that the predetermined range 300 refers to, for example, a range in which the power supply apparatus 100 can communicate with the power receiving apparatus 200. Note also that although the predetermined range 300 is described as a range on a body of the power supply apparatus 100, this is not intended to be limiting. Furthermore, the power supply apparatus 100 may wirelessly supply power to a plurality of electronic apparatuses.

The power receiving apparatus 200 may be any electronic apparatus that has a function of wirelessly receiving power. For example, the power receiving apparatus 200 may be an image capturing apparatus or a reproduction apparatus, or may be a communication apparatus, such as a mobile phone or a smartphone, or a battery pack including a battery. Moreover, the power receiving apparatus 200 may be an automobile, a display, or a personal computer.

Figure 2:
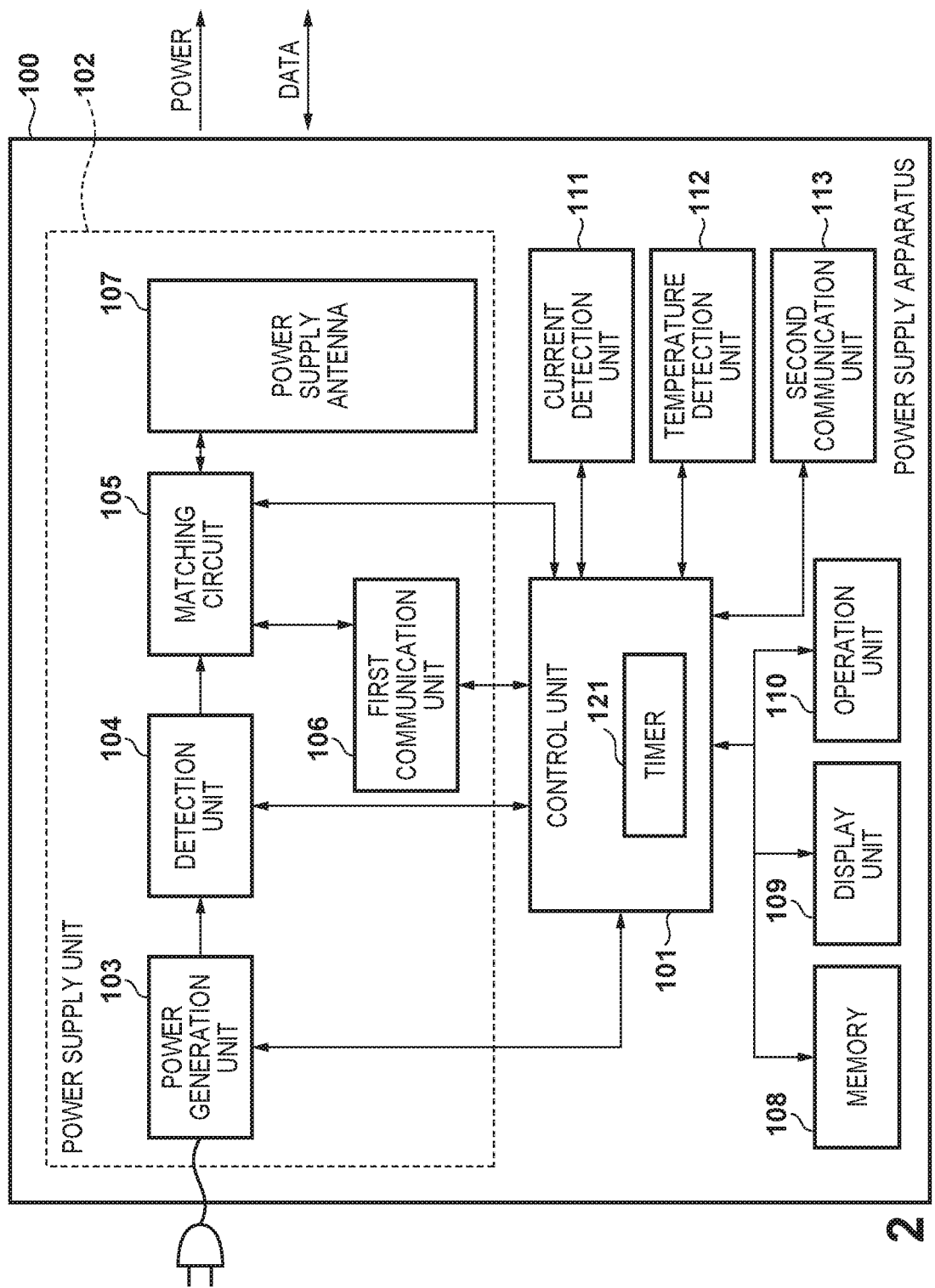
FIG. 2 is a block diagram showing an example of a power supply apparatus according to an embodiment.

Next, an example of the configuration of the power supply apparatus 100 according to the embodiment is described with reference to FIG. 2. As shown in FIG. 2, the power supply apparatus 100 includes a control unit 101, a power supply unit 102, a memory 108, a display unit 109, an operation unit 110, a current detection unit 111, a temperature detection unit 112, and a second communication unit 113. The power supply unit 102 includes a power generation unit 103, a detection unit 104, a matching circuit 105, a first communication unit 106, and a power supply antenna 107.

The control unit 101 executes a computer program recorded in the memory 108 to control the power supply apparatus 100. The control unit 101 includes, for example, a CPU (Central Processing Unit) and an MPU (Micro Processing Unit). It should be noted that the control unit 101 is configured in the form of hardware. Moreover, the control unit 101 includes a timer 121. The purpose of the timer 121 is described later.

The power supply unit 102 is used for wirelessly supplying power according to a predetermined power supply method. The predetermined power supply method refers to, for example, a power supply method using a magnetic resonance method. By the magnetic resonance method, power is transferred from the power supply apparatus 100 to the power receiving apparatus 200 in a state where resonance is established between the power supply apparatus 100 and the power receiving apparatus 200. The state where resonance is established between the power supply apparatus 100 and the power receiving apparatus 200 refers to a state where a resonant frequency of the power supply antenna 107 of the power supply apparatus 100 and a resonant frequency of a power receiving antenna 203 (shown in FIG. 3) of the power receiving apparatus 200 match a frequency of supplied power, it should be noted that the predetermined power supply method may use a different method other than the magnetic resonance method.

When the power supply apparatus 100 is connected to an AC power source, which is not illustrated, the power generation unit 103 uses power from the non-illustrated AC power source to generate power that is to be externally output via the power supply antenna 107. The power generated by the power generation unit 103 includes communication power and predetermined power. The communication power is used for communication between the first communication unit 106 and the power receiving apparatus 200. For example, the communication power is weak power of 1 W or less. It should be noted that the communication power may be specified in a communication standard of the first communication unit 106. The predetermined power is used for charging of the power receiving apparatus 200 and for a specific operation performed by the power receiving apparatus 200. For example, the predetermined power is power of 2 W or more. Moreover, the predetermined power is only required to be larger than the communication power, and thus is not limited to power of 2 W or more. A value of the predetermined power is set by the control unit 101, based on data obtained from the power receiving apparatus 200. The predetermined power generated by the power generation unit 103 is supplied to the power supply antenna 107 via the detection unit 104 and the matching circuit 105.

The detection unit 104 detects a VSWR (Voltage Standing Wave Ratio) to detect a resonant condition between the power supply apparatus 100 and the power receiving apparatus 200. Moreover, the detection unit 104 provides data indicating the detected VSWR to the control unit 101. The VSWR is a value indicating a relationship between a traveling wave of power output from the power supply antenna 107 and a reflected wave of power output from the power supply antenna 107. Using the data on the VSWR provided by the detection unit 104, the control unit 101 can detect a change in the resonant condition between the power supply apparatus 100 and the power receiving apparatus 200 and also detect the presence of a foreign object. The foreign object is a metal or an IC card, for example. It should be noted that the foreign object may be an apparatus having no charging means of charging a battery or an apparatus having no communication means of communicating with the power supply apparatus 100. Note also that the foreign object may be an apparatus that does not comply with the communication standard of the first communication unit 106.

The matching circuit 105 includes a circuit that sets the resonant frequency of the power supply antenna 107 and a circuit that performs impedance matching between the power generation unit 103 and the power supply antenna 107. When the power supply apparatus 100 outputs either one of the communication power and the predetermined power via the power supply antenna 107, the control unit 101 performs control to cause the matching circuit 105 to set the resonant frequency of the power supply antenna 107 to a predetermined frequency f. For example, the predetermined frequency f is 13.56 MHz. Here, the predetermined frequency f may be 6.78 MHz or may be a frequency specified in the communication standard of the first communication unit 106.

The first communication unit 106 performs wireless communication according to, for example, the NFC (Near Field Communication) standard defined by the NFC Forum. It should be noted that the communication standard with which the first communication unit 106 complies may be the ISO/IEC 18092 standard, the ISO/IEC 14443 standard, or the ISO/IEC 21481 standard, for example. When the communication power is output from the power supply antenna 107, the first communication unit 106 can transmit and receive data for wireless power supply to and from the power receiving apparatus 200 via the power supply antenna 107. On the other hand, during a period of power supply processing during which the predetermined power is output from the power supply antenna 107, the first communication unit 106 does not communicate with the power receiving apparatus 200 via the power supply antenna 107. Hereinafter, the period during which the predetermined power is output from the power supply antenna 107 is referred to as the "power supply period". The power supply period is set by the control unit 101 based on data obtained from the power receiving apparatus 200.

The data transmitted and received between the first communication unit 106 and the power receiving apparatus 200 conforms to the NDEF (NFC Data Exchange Format). When transmitting data conforming to the NDEF to the power receiving apparatus 200, the first communication unit 106 performs processing of superimposing the data on the communication power provided by the power generation unit 103. The communication power on which the data is superimposed is transmitted to the power receiving apparatus 200 via the power supply antenna 107.

Moreover, when receiving data conforming to the NDEF from the power receiving apparatus 200, the first communication unit 106 detects a current passing through the power supply antenna 107. Then, depending on the result of this current detection, the first communication unit 106 receives the data from the power receiving apparatus 200. This is because, when transmitting the data conforming to the NDEF to the power supply apparatus 100, the power receiving apparatus 200 changes an internal load of the power receiving apparatus 200 to transmit the data. The change in the internal load of the power receiving apparatus 200 results in a change in the current passing through the power supply antenna 107. Thus, the first communication unit 106 can receive the data conforming to the NDEF from the power receiving apparatus 200 by detecting the current passing through the power supply antenna 107. It should be noted that the first communication unit 106 operates as a reader/writer specified in the NFC standard.

The power supply antenna 107 is an antenna that outputs either one of the communication power and the predetermined power to the power receiving apparatus 200. Moreover, the power supply antenna 107 is used for wireless communication compliant with the NFC standard, performed between the first communication unit 106 and the power receiving apparatus 200. More specifically, the same antenna is used both for the power supply processing and for the wireless communication. The configuration of the power supply unit 102 has been described thus far.

The memory 108 records the computer program for controlling the power supply apparatus 100. Moreover, the memory 108 records, for example, identification data of the power supply apparatus 100, power supply parameters related to the power supply apparatus 100, and flags for power supply control. Furthermore, the memory 108 records data obtained from the power receiving apparatus 200 by at least one of the first communication unit 106 and the second communication unit 113.

The display unit 109 displays video data provided by the memory 108 and the second communication unit 113. The operation unit 110 provides a user interface to operate the power supply apparatus 100. For example, the operation unit 110 has buttons, switches, and a touch panel used for operating the power supply apparatus 100. The control unit 101 controls the power supply apparatus 100 according to an input signal input via the operation unit 110.

The current detection unit 111 detects the current passing through the power supply antenna 107 and provides data indicating the detected current to the control unit 101. Using the data on current provided by the current detection unit 111, the control unit 101 can detect the presence of a foreign object. The temperature detection unit 112 detects a temperature of the power supply apparatus 100 and provides data indicating the detected temperature to the control unit 101. Using the data on temperature provided by the temperature detection unit 112, the control unit 101 can detect the presence of a foreign object. It should be noted that the temperature of the power supply apparatus 100 detected by the temperature detection unit 112 may be an internal temperature of the power supply apparatus 100 or a surface temperature of the power supply apparatus 100.

The second communication unit 113 wirelessly communicates with the power receiving apparatus 200 compliant with a communication standard different from the communication standard of the first communication unit 106. For example, the communication standard of the second communication unit 113 is the wireless LAN (Wireless Local Area Network) standard or the Bluetooth (registered trademark) standard. The second communication unit 113 allows data including at least one of video data, audio data, and a command to be transmitted and received between the power supply apparatus 100 and the power receiving apparatus 200.

The power supply apparatus 100 is described as wirelessly supplying power to the power receiving apparatus 200. Here, "wirelessly" may be stated as "in a non-contacting manner" or "contactlessly" in the present embodiment.

Figure 3:
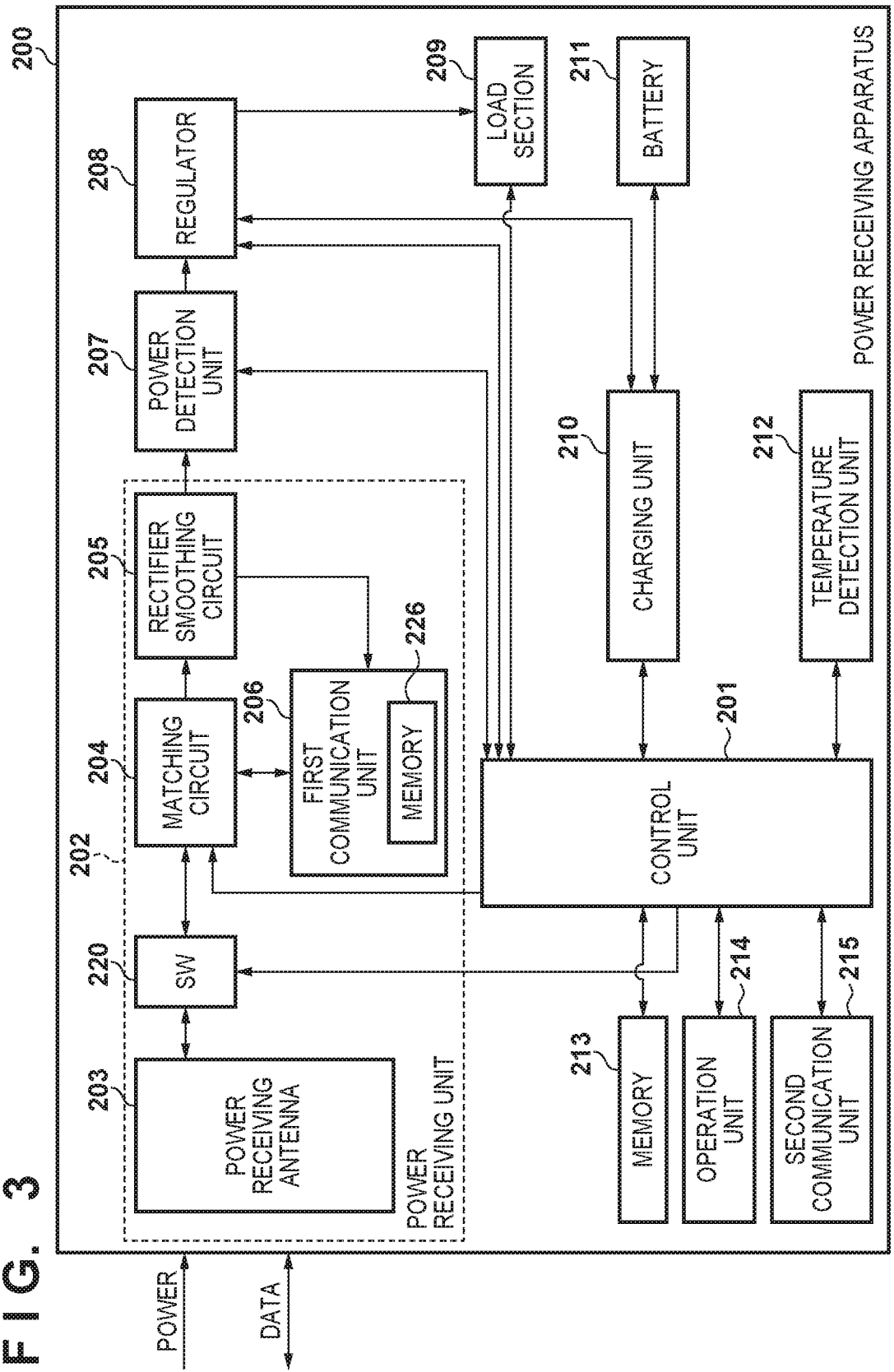
FIG. 3 is a block diagram showing an example of an electronic apparatus according to an embodiment.

Next, an example of the configuration of the power receiving apparatus 200 is described with reference to FIG. 3. The power receiving apparatus 200 includes a control unit 201, a power receiving unit 202, a power detection unit 207, a regulator 208, a load section 209, a charging unit 210, a battery 211, a temperature detection unit 212, a memory 213, an operation unit 214, and a second communication unit 215. The power receiving unit 202 includes a power receiving antenna 203, a power reception unit changeover switch 220, a matching circuit 204, a rectifier smoothing circuit 205, and a first communication unit 206.

The control unit 201 executes a computer program recorded in the memory 213 to control the power receiving apparatus 200. The control unit 201 includes, for example, a CPU and an MPU. It should be noted that the control unit 201 is configured in the form of hardware. The power receiving unit 202 complies with the predetermined power supply method used by the power supply apparatus 100 and wirelessly receives power from the power supply apparatus 100.

The power receiving antenna 203 is an antenna that receives power supplied from the power supply apparatus 100. Moreover, the power receiving antenna 203 is used for wireless communication compliant with the NFC standard, performed between the first communication unit 206 and the power supply apparatus 100. The power received by the power receiving apparatus 200 from the power supply apparatus 100 via the power receiving antenna 203 is supplied to the rectifier smoothing circuit 205 via the matching circuit 204.

The matching circuit 204 includes a circuit that sets a resonant frequency of the power receiving antenna 203. The control unit 201 can control the matching circuit 204 so that the resonant frequency of the power receiving antenna 203 is set. The rectifier smoothing circuit 205 generates direct-current power using the power received by the power receiving antenna 203. Moreover, the rectifier smoothing circuit 205 provides the generated direct-current power to the regulator 208 via the power detection unit 207. When data is superimposed on the power received by the power receiving antenna 203, the rectifier smoothing circuit 205 provides, to the first communication unit 206, the data removed from the power received by the power receiving antenna 203.

The power reception unit changeover switch 220 is an example of a switching unit that switches between a connection state and a disconnection state between the power receiving antenna 203 and a load side. In the present embodiment, a switch that turns on and off the connection between the power receiving antenna 203 and power receiving circuits is used. Switching the power reception unit changeover switch 220 from on to off enables an unconnected (open) state between the power receiving antenna 203 and the power receiving circuits including the matching circuit 204 and the circuits located downstream of the matching circuit 204. To be more specific, when the power reception unit changeover switch 220 is off, the power receiving apparatus 200 seems not to exist to the power supply apparatus 100.

Figure 4:
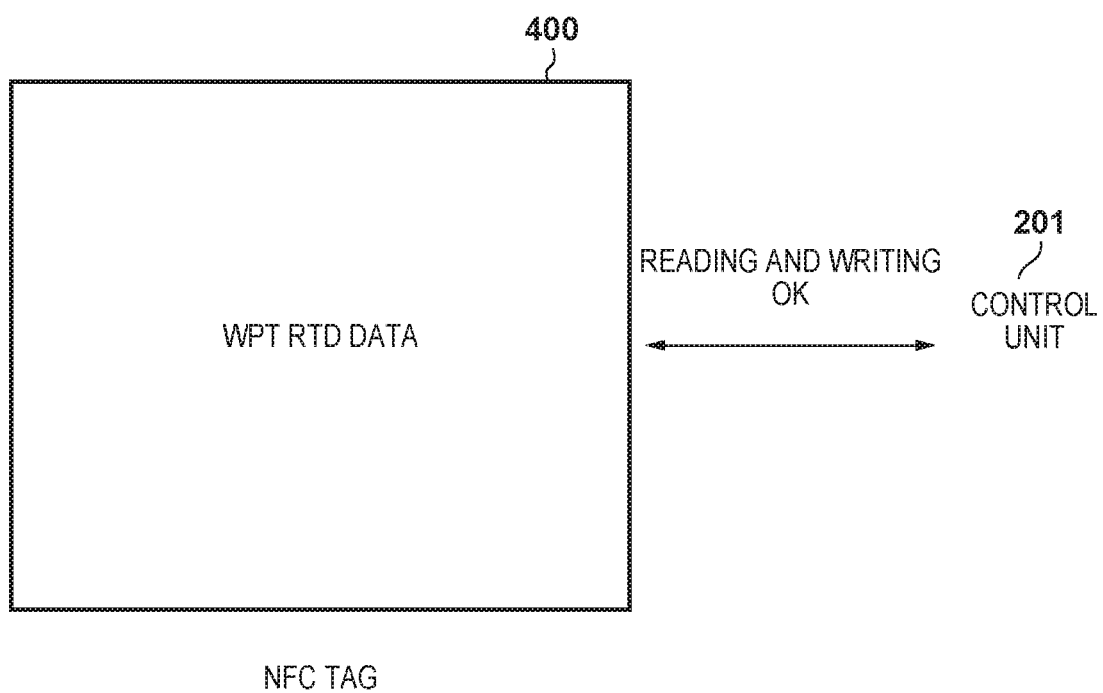
FIG. 4 is a diagram showing a tag of an electronic apparatus according to an embodiment.

The first communication unit 206 communicates with the power supply apparatus 100 compliant with the same communication standard as that of the first communication unit 106 of the power supply apparatus 100. The first communication unit 206 includes a memory 226. The memory 226 records WPT (Wireless Power Transfer) RTD (Record Type Definition) data 400 (FIG. 4). The WPT RTD data 400 includes a plurality of data sets conforming to the NDEF. Moreover, the WPT RFD data 400 includes data necessary for wireless power supply performed between the power supply apparatus 100 and the power receiving apparatus 200.

Furthermore, the WPT RTD data 400 includes authentication data used at least for wireless-power-supply authentication performed together with the power supply apparatus 100. The authentication data includes: a record type name; data indicating the power supply method and a power supply control protocol supported by the power receiving apparatus 200; identification data of the power receiving apparatus 200; power receiving capacity data on the power receiving apparatus 200; and data indicating a type of a tag held by the power receiving apparatus 200. The record type name refers to data that indicates a record type for identifying the details and structure of the data stored in the WMT RTD data 400. The record type name is the data used for identifying the WPT RTD data 400. The power receiving capacity data indicates the power receiving capacity of the power receiving apparatus 200 and thus indicates, for example, a maximum value of power receivable by the power receiving apparatus 200.

The WPT RTD data 400 may also include power receiving status data and power supply status data. The power receiving status data includes data indicating a status of the power receiving apparatus 200. For example, the power receiving status data includes: a value of requested power that is requested of the power supply apparatus 100; a value of power received by the power receiving apparatus 200 from the power supply apparatus 100; data on a remaining capacity of the battery 211 and on charging of the battery 211; and error data on an error of the power receiving apparatus 200. The error data includes: data indicating whether or not an error is occurring to the power receiving apparatus 200; and data indicating the type of the error. The power supply status data includes data indicating a status of the power supply apparatus 100. For example, the power supply status data includes: the identification data of the power supply apparatus 100; data indicating whether or not the power supply apparatus 100 starts transferring the predetermined power to the power receiving apparatus 200; and the power supply parameters set by the power supply apparatus 100.

The first communication unit 206 analyzes the data provided by the rectifier smoothing circuit 205. After this, using the result of the data analysis, the first communication unit 206 transmits the data read from the WPT RTD data 400 to the power supply apparatus 100 and writes the data received from the power supply apparatus 100 into the WPT RTD data 400, for example. Moreover, the first communication unit 206 transmits, to the power supply apparatus 100, response data corresponding to the data provided by the rectifier smoothing circuit 205. As described thus far, the first communication unit 206 performs processing of changing the internal load of the first communication unit 206 to transmit, to the power supply apparatus 100, the data included in the WPT RTD data 400 read from the memory 226 and the response data.

The memory 226 of the power receiving apparatus 200 forms a tag defined by, for example, the NFC standard. The tag provided in the power receiving apparatus 200 is described with reference to FIG. 4. The control unit 201 can read the WPT RTD data 400 stored in the tag (the memory 226) via an internal bus interface which is not illustrated. Moreover, the control unit 201 can write the WPT RTD data 400 into the tag (the memory 226) via the non-illustrated internal bus interface.

The control unit 201 can control each of the units included in the power receiving apparatus 200 using, for example, the power supply status data obtained from the WPT RTD data 400. For example, the control unit 201 can periodically detect the power receiving status data using the data provided by the units of the power receiving apparatus 200, and write the detected power receiving status data as a part of the WPT RTD data 400. It should be noted that the tag provided in the power receiving apparatus 200 may also be referred to as the "active tag" or "dynamic tag". When the power receiving apparatus 200 is provided with the tag as shown in FIG. 4, the WPT RTD data 400 includes the identification data, the power receiving status data, and the power supply status data.

It should be noted that the power supply apparatus 100 can read the data included in the WPT RTD data 400 using the first communication unit 106. Moreover, in this case, the power supply apparatus 100 can also write data into the WPT RTD data 400 using the first communication unit 106.

Referring back to FIG. 3, the power detection unit 207 detects the power received via the power receiving antenna 203 and provides data indicating the detected power to the control unit 201. Using the data on power provided by the power detection unit 207, the control unit 201 determines whether or not a first error is occurring to the power receiving apparatus 200. The first error refers to, for example, an error that occurs when the power receiving apparatus 200 receives, from the power supply apparatus 100, an amount of power larger than the maximum value of power receivable by the power receiving apparatus 200.

For example, the control unit 201 compares the maximum value of power receivable by the power receiving apparatus 200 with the value of power detected by the power detection unit 207. Then, based on the result of the comparison, the control unit 201 determines whether or not the first error is occurring to the power receiving apparatus 200. If the power detected by the power detection unit 207 is larger than the maximum value of power receivable by the power receiving apparatus 200, the control unit 201 determines that the first error is occurring to the power receiving apparatus 200. If the power detected by the power detection unit 207 is smaller than or equal to the maximum value of power receivable by the power receiving apparatus 200, the control unit 201 determines that the first error is not occurring to the power receiving apparatus 200. If it is determined that the first error is occurring to the power receiving apparatus 200, the control unit 201 writes, into the WPT RTD data 400, the power receiving status data that includes data indicating that the first error is occurring to the power receiving apparatus 200 and data indicating the first error.

Furthermore, using the data on power provided by the power detection unit 207, the control unit 201 determines whether or not a second error is occurring to the power receiving apparatus 200. The second error refers to, for example, an error that occurs when the power received by the power receiving apparatus 200 from the power supply apparatus 100 is less than the requested power that the power receiving apparatus 200 requests from the power supply apparatus 100. For example, the control unit 201 compares the value of the requested power with the value of power detected by the power detection unit 207. Then, based on the result of the comparison, the control unit 201 determines whether or not the second error is occurring to the power receiving apparatus 200.

If the value of power detected by the power detection unit 207 is smaller than the value of the requested power, the control unit 201 determines that the second error is occurring to the power receiving apparatus 200. If the value of power detected by the power detection unit 207 is larger than or equal to the value of the requested power, the control unit 201 determines that the second error is not occurring to the power receiving apparatus 200. If it is determined that the second error is occurring to the power receiving apparatus 200, the control unit 201 writes, into the WPT RTD data 400, the power receiving status data that includes data indicating that the second error is occurring to the power receiving apparatus 200 and data indicating the second error.

The regulator 208 supplies at least one of the power provided by the rectifier smoothing circuit 205 and the power provided by the battery 211, to each of the units in the power receiving apparatus 200 according to an instruction from the control unit 201. The load section 209 includes: an image capturing circuit that generates video data, such as a still image and a moving image, from an optical image of a subject; and a reproduction circuit that reproduces the video data.

The charging unit 210 charges the battery 211. According to an instruction from the control unit 201, the charging unit 210 controls whether to charge the battery 211 using the power supplied from the regulator 208 or to supply the power discharged from the battery 211 to the regulator 208. The charging unit 210 periodically detects the remaining capacity of the battery 211 and provides, to the control unit 201, the data indicating the remaining capacity of the battery 211 and the data on charging of the battery 211. The battery 211 is connectable to the power receiving apparatus 200. Moreover, the battery 211 is a chargeable secondary battery, and is a lithium-ion battery for example. Note that the battery 211 may be a different battery other than the lithium-ion battery.

The control unit 201 determines whether or not a third error is occurring to the power receiving apparatus 200, depending on whether or not the power receiving apparatus 200 and the battery 211 are connected to each other. The third error refers to, for example, an error that occurs when the battery 211 is not connected to the power receiving apparatus 200. If the battery 211 is not connected to the power receiving apparatus 200, the control unit 201 determines that the third error is occurring to the power receiving apparatus 200. If the battery 211 is connected to the power receiving apparatus 200, the control unit 201 determines that the third error is not occurring to the power receiving apparatus 200. If it is determined that the third error is occurring to the power receiving apparatus 200, the control unit 201 writes, into the WPT RTD data 400, the power receiving status data that includes data indicating that the third error is occurring to the power receiving apparatus 200 and data indicating the third error.

The temperature detection unit 212 detects a temperature of the power receiving apparatus 200 and provides data indicating the detected temperature to the control unit 201. Using the data on temperature provided by the temperature detection unit 212, the control unit 201 determines whether or not a fourth error is occurring to the power receiving apparatus 200. The fourth error refers to, for example, an error that occurs when an internal temperature of the power receiving apparatus 200 reaches a high temperature.

The control unit 201 compares a set value with the temperature detected by the temperature detection unit 212. Then, based on the result of the comparison, the control unit 201 determines whether or not the fourth error is occurring to the power receiving apparatus 200. For example, the set value is an upper limit of temperature such that the battery 211 can be charged normally. Moreover, the set value may be an upper limit of temperature such that the power receiving unit 202 and the load section 209 can be protected. If the temperature detected by the temperature detection unit 212 is higher than the set value, the control unit 201 determines that the fourth error is occurring to the power receiving apparatus 200. If the temperature detected by the temperature detection unit 212 is lower than or equal to the set value, the control unit 201 determines that the fourth error is not occurring to the power receiving apparatus 200. If it is determined that the fourth error is occurring to the power receiving apparatus 200, the control unit 201 writes, into the WPT RTD data 400, the power receiving status data that includes data indicating that the fourth error is occurring to the power receiving apparatus 200 and data indicating the fourth error.

The memory 213 stores a computer program to control the power receiving apparatus 200 and data on, for example, parameters related to the power receiving apparatus 200. The operation unit 214 provides a user interface to operate the power receiving apparatus 200. The control unit 201 controls the power receiving apparatus 200 according to an input signal input via the operation unit 214. The second communication unit 215 wirelessly communicates with the power supply apparatus 100. It should be noted that the second communication unit 215 performs wireless communication compliant with the same communication standard as that of the second communication unit 113 of the power supply apparatus 100.

State Transition Diagram of Power Supply Apparatus 100

Figure 5:
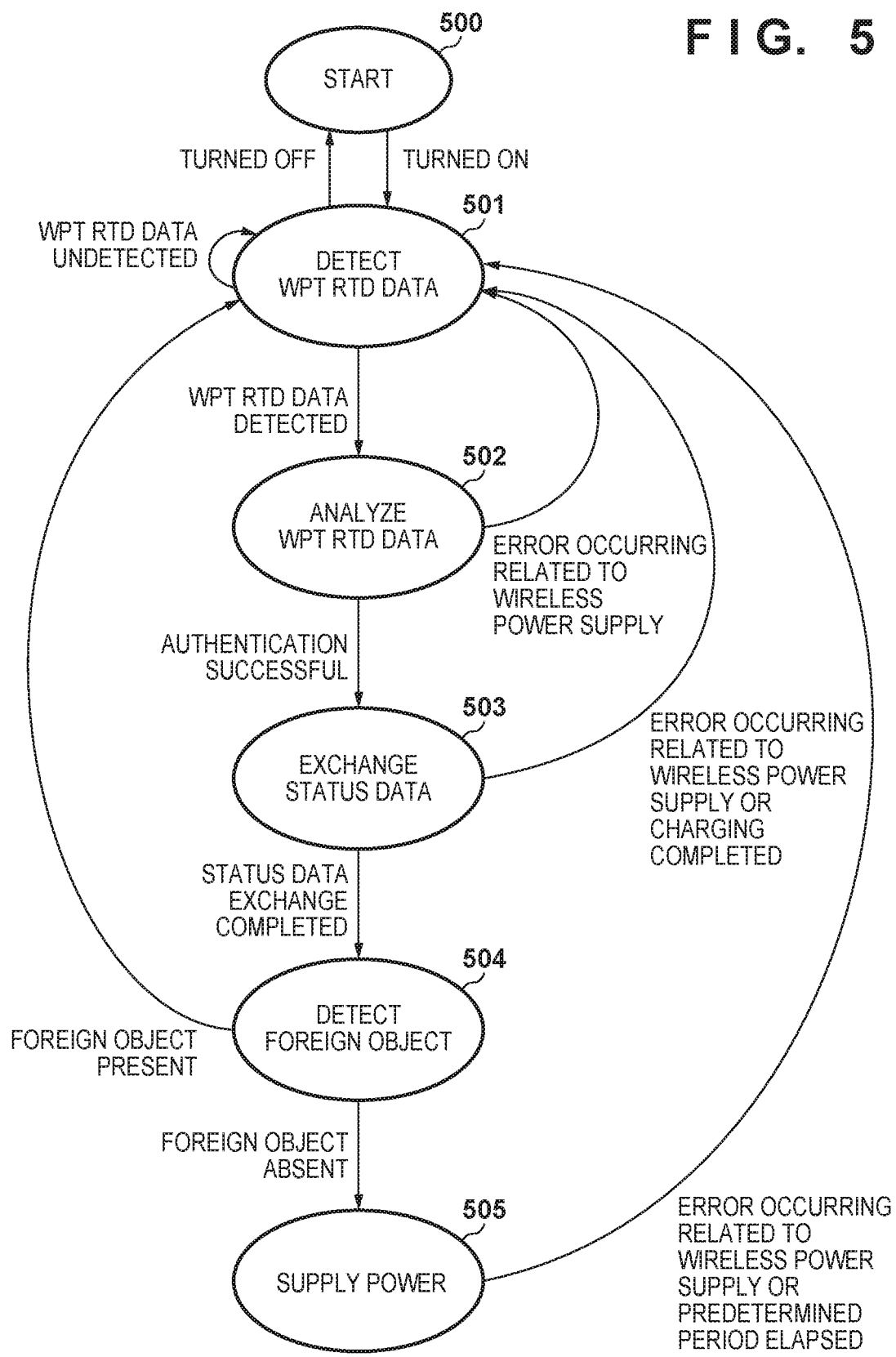
FIG. 5 is a state transition diagram showing an example of state transitions of a power supply apparatus according to an embodiment.

A state transition of the power supply apparatus 100 according to the embodiment is described with reference to FIG. 5. In state 500 of FIG. 5, the power supply apparatus 100 is connected to the non-illustrated AC power source and is in the off state. When tuned on using the operation unit 110 in state 500, the power supply apparatus 100 transits to state 501.

In state 501, the power supply apparatus 100 performs processing of detecting the WPT RTD data 400. When turned off in state 501, the power supply apparatus 100 transits to state 500. When detecting the WPT RTD data 400 in state 501, the power supply apparatus 100 transits to state 502. When the RTD for wireless power supply is not detected, the power supply apparatus 100 remains in state 501 until the WPT RTD data 400 is detected.

In state 502, the power supply apparatus 100 performs processing of analyzing the detected WPT RTD data 400. When authentication for wireless power supply between the power supply apparatus 100 and the power receiving apparatus 200 is successful in state 502 as a result of the analysis of the WPT RTD data 400, the power supply apparatus 100 transits to state 503. If an error related to wireless power supply occurs in state 502, the power supply apparatus 100 transits to state 501. Examples of the error related to wireless power supply include: a communication error related to communication between the power supply apparatus 100 and the power receiving apparatus 200; an error related to a foreign object; an error related to the power receiving apparatus 200; and an authentication error related to authentication for wireless power supply between the power supply apparatus 100 and the power receiving apparatus 200.

In state 503, the power supply apparatus 100 performs processing of exchanging the status data necessary for wireless power supply with the power receiving apparatus 200. In state 503, the power supply apparatus 100 receives the power receiving status data from the power receiving apparatus 200 and transmits the power supply status data to the power receiving apparatus 200. When the exchange of the status data is completed in state 503, the power supply apparatus 100 transits to state 504. If the error related to wireless power supply occurs in state 503, the power supply apparatus 100 transits to state 501. When detecting, in state 503, that charging of the power receiving apparatus 200 is completed, the power supply apparatus 100 transits to state 501.

In state 504, the power supply apparatus 100 detects the presence or absence of a foreign object that is not a power supply target. If the foreign object in state 504 is detected, the power supply apparatus 100 transits to state 501. If the foreign object in state 504 is not detected, the power supply apparatus 100 transits to state 505. In state 505, the power supply apparatus 100 performs power supply processing to supply the predetermined power to the power receiving apparatus 200. If the error related to wireless power supply occurs in state 505, the power supply apparatus 100 transits from state 505 to state 501. In state 505, after the power supply period, which is a predetermined period from the start of output of the predetermined power, has elapsed, the power supply apparatus 100 transits to state 501.

Control Processing

Figure 6:
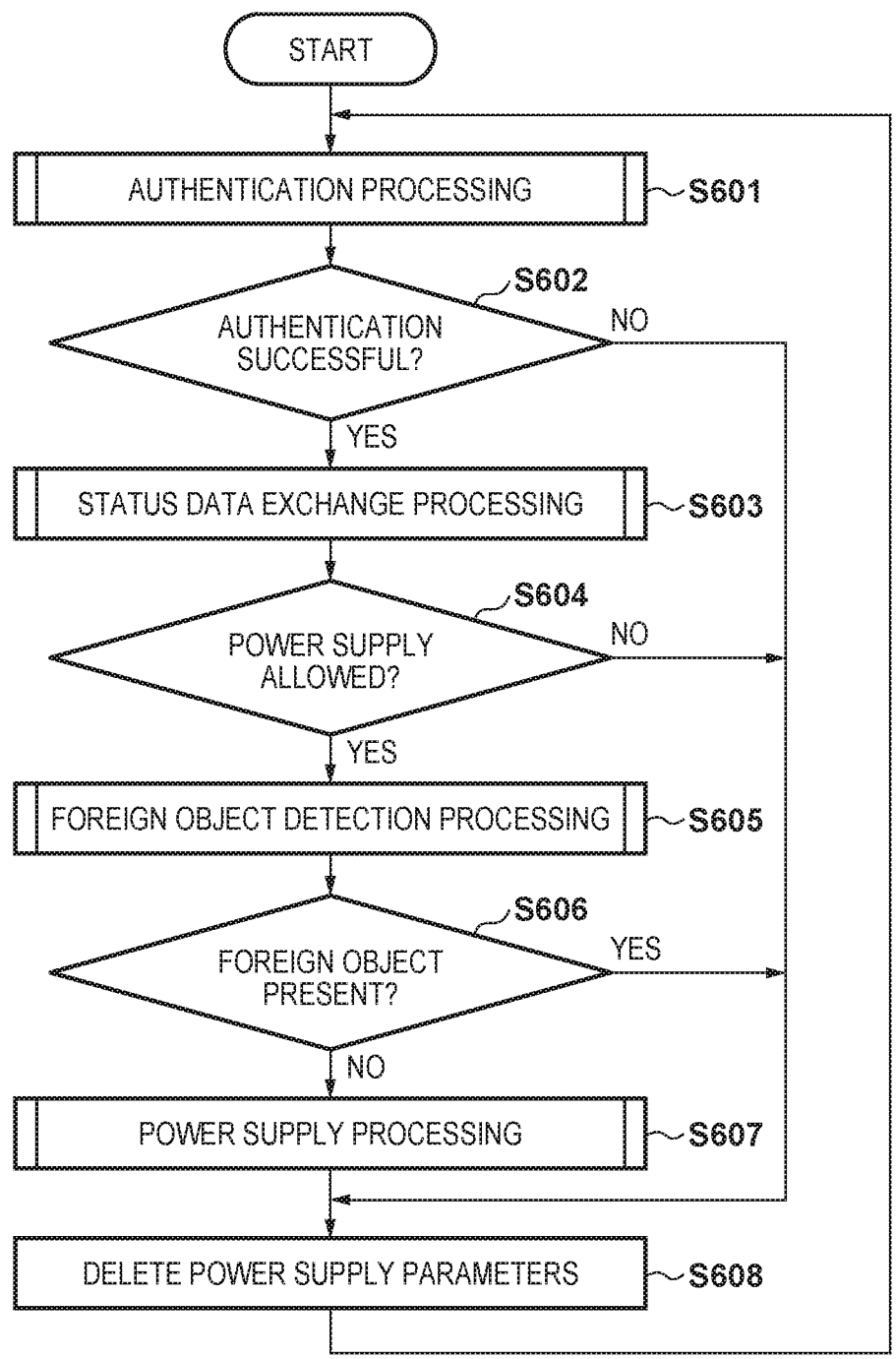
FIG. 6 is a flowchart showing an example of control processing performed by the power supply apparatus.

Next, control processing performed to control wireless power supply of the power supply apparatus 100 according to the embodiment is described, with reference to the flowchart shown in FIG. 6. The control processing is achieved by the control unit 101 executing the computer program stored in the memory 108. The processing shown in this flowchart is started when the power supply apparatus 100 is turned on.

In S601, the control unit 101 performs authentication processing that is described later. Then, in S602, the control unit 101 determines whether or not authentication for wireless power supply between the power supply apparatus 100 and the power receiving apparatus 200 is successful. When the authentication processing is performed in S601, either one of an authentication success flag and an authentication failure flag is set in the memory 108. If the authentication success flag is set in the memory 108, the control unit 101 determines that the authentication for wireless power supply is successful (YES in S602) and proceeds to S603. On the other hand, if the authentication failure flag is set in the memory 108, the control unit 101 determines that the authentication for wireless power supply is failed (NO in S602) and proceeds to S608.

In S603, the control unit 101 performs status data exchange processing that is described later. Then, in S604, the control unit 101 determines whether or not the power supply apparatus 100 is allowed to supply power to the power receiving apparatus 200, based on the result of the status data exchange processing. When the status data exchange processing is performed in S603, either one of a power supply enable flag and a power supply disable flag is set in the memory 108. If the power supply enable flag is set in the memory 108, the control unit 101 determines that the power supply apparatus 100 is allowed to supply power to the power receiving apparatus 200 (YES in S604) and proceeds to S605. On the other hand, if the power supply disable flag is set in the memory 108, the control unit 101 determines that the power supply apparatus 100 is not allowed to supply power to the power receiving apparatus 200 (NO in S604) and proceeds to S608.

In S605, the control unit 101 performs foreign object detection processing to detect the presence of a foreign object that is not a power supply target. The foreign object detection processing is described in detail later. After performing the foreign object detection processing, the control unit 101 determines in S606 whether or not the foreign object that is not a power supply target is detected near the power supply apparatus 100 in S605. If the foreign object is not detected (NO in S606), the control unit 101 proceeds to S607. In S607, the control unit 101 performs wireless power supply (the power supply processing) using the power supply antenna 107. The power supply processing is described later. On the other hand, if the foreign object is detected in the foreign object detection processing (YES in S606), the control unit 101 proceeds to S608 without performing the power supply processing. In S608, the control unit 101 deletes, from the memory 108, the power supply parameters and the flags for power supply control. After this, the control unit 101 returns to S601.

As described thus far, the power supply output through the power supply processing is inhibited (or, the power supply processing is inhibited) When the foreign object that is not a power supply target is detected in the foreign object detection processing, according to the present embodiment. However, the restriction on the power supply output applied when the foreign object that is not a power supply target is detected in the foreign object detection processing is not limited to this. For example, the power supply output may be restricted to a predetermined power value or lower.

Authentication Processing

Figure 7:
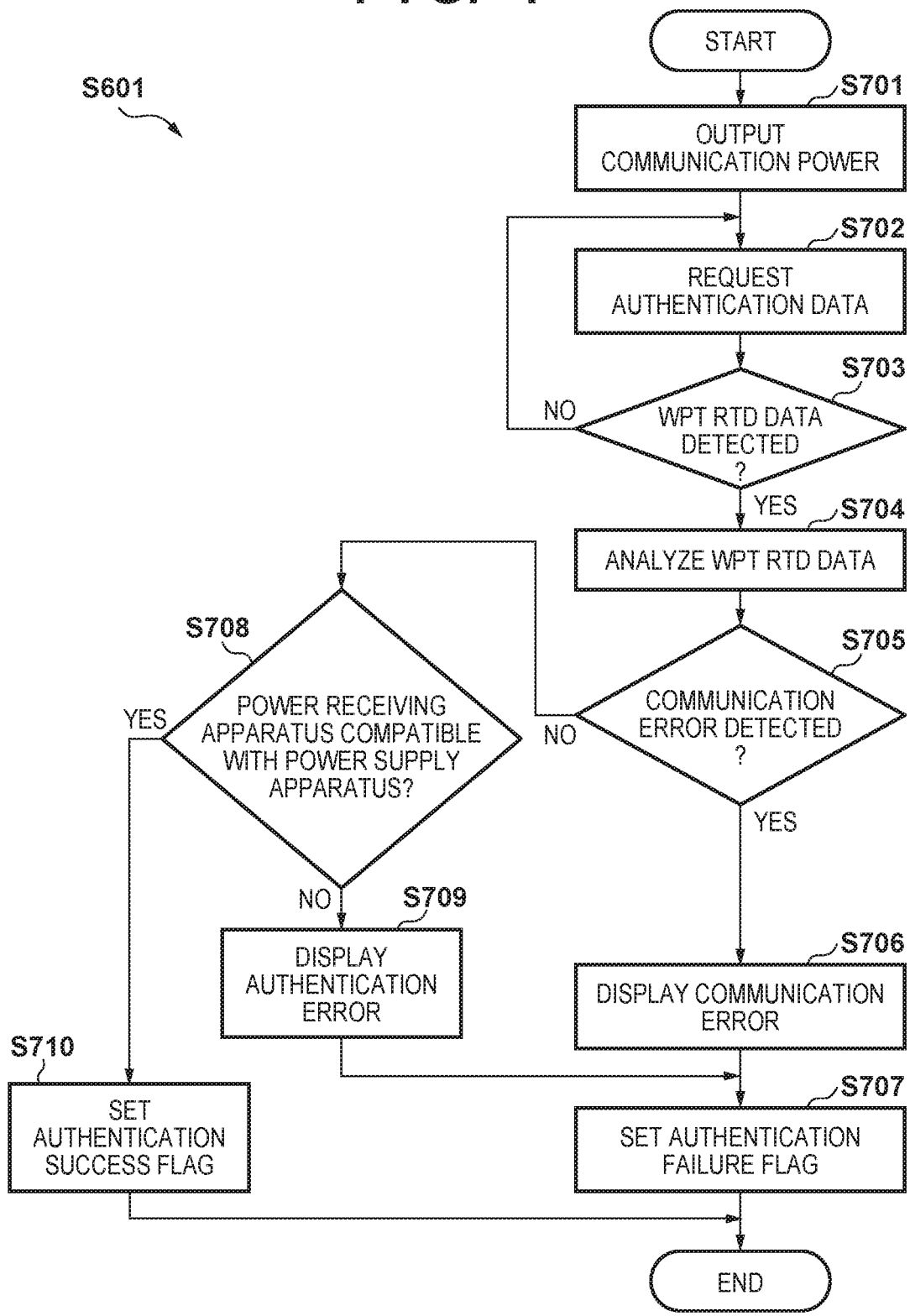
FIG. 7 is a flowchart showing an example of authentication processing performed by the power supply apparatus.

Next, the authentication processing performed by the control unit 101 in S601 of FIG. 6 according to the embodiment is described, with reference to the flowchart shown in FIG. 7. The authentication processing can be achieved by the control unit 101 executing the computer program stored in the memory 108.

In S701, the control unit 101 performs control to cause the power supply unit 102 to output the communication power. It should be noted that the control unit 101 controls the power generation unit 103 so that the communication power is output via the power supply antenna 107 until the start of the processing of outputting the predetermined power After this, the control unit 101 performs control to cause the first communication unit 106 to transmit a polling command to detect the presence or absence of an electronic apparatus capable of communicating with the first communication unit 106. When the electronic apparatus capable of communicating with the first communication unit 106 is detected, the control unit 101 proceeds to S702.

In S702, the control unit 101 performs control to cause the first communication unit 106 to transmit data for requesting the transmission of the authentication data. Following this, the control unit 101 determines in S703 whether or not the WPT RTD data 400 is detected. When the first communication unit 106 receives the authentication data from the power receiving apparatus 200, the control unit 101 obtains the record type name of the power receiving apparatus 200 from the authentication data of the power receiving apparatus 200. After this, the control unit 101 determines, based on the record type name of the power receiving apparatus 200, whether or not the WPT RTD data 400 is detected. If the WPT RTD data 400 is detected (YES in S703), the control unit 101 proceeds to S704. On the other hand, if the WPT RTD data 400 is not detected (NO in S703), the control unit 101 returns to S702 and repeats the above process. Note that the control unit 101 also returns to S702 if the first communication unit 106 does not receive the authentication data from the power receiving apparatus 200.

In S704, the control unit 101 analyzes the WPT RTD data 400 of the power receiving apparatus 200. Through this analysis, the data included in the authentication data of the power receiving apparatus 200 is verified, for example. Next, in S705, the control unit 101 determines, based on the result of the analysis in S704, whether or not a communication error is occurring to the authentication data of the power receiving apparatus 200. If the communication error is detected in the authentication data of the power receiving apparatus 200 (YES in S705), the control unit 101 proceeds to S706. In S706, the control unit 101 causes the display unit 109 to display data indicating that the communication error is detected between the power supply apparatus 100 and the power receiving apparatus 200. Next, in S707, the control unit 101 sets the authentication failure flag in the memory 108. Then, the authentication processing is ended and the control unit 101 proceeds to S602 in FIG. 6.

On the other hand, if the communication error is not detected in the authentication data of the power receiving apparatus 200 as a result of the analysis of the WPT RTD data 400 (NO in S705), the control unit 101 proceeds to S708. In S708, the control unit 101 determines, based on the result of the analysis in S704, whether or not the power receiving apparatus 200 is compatible with the power supply apparatus 100. For example, if the power supply method supported by the power supply apparatus 100 matches the power supply method supported by the power receiving apparatus 200, the control unit 101 determines that the power receiving apparatus 200 is compatible with the power supply apparatus 100. On the other hand, if the power supply method supported by the power supply apparatus 100 does not match the power supply method supported by the power receiving apparatus 200, the control unit 101 determines that the power receiving apparatus 200 is incompatible with the power supply apparatus 100.

As another example, if the power supply control protocol supported by the power supply apparatus 100 matches the power supply control protocol supported by the power receiving apparatus 200, the control unit 101 determines that the power receiving apparatus 200 is compatible with the power supply apparatus 100. On the other hand, if the power supply control protocol supported by the power supply apparatus 100 does not match the power supply control protocol supported by the power receiving apparatus 200, the control unit 101 determines that the power receiving apparatus 200 is incompatible with the power supply apparatus 100.

If it is determined that the power receiving apparatus 200 is incompatible with the power supply apparatus 100 (NO in S708), the control unit 101 proceeds to S709. In S709, the control unit 101 causes the display unit 109 to display data indicating that the authentication error is detected between the power supply apparatus 100 and the power receiving apparatus 200. Then, the control unit 101 proceeds to S707 described above. On the other hand, if it is determined that the power receiving apparatus 200 is compatible with the power supply apparatus 100 (YES in S708), the control unit 101 proceeds to S710. In S710, the control unit 101 sets the authentication success flag in the memory 108. After the end of S710, the authentication processing is ended and the control unit 101 proceeds to S602 in FIG. 6.

It should be noted that the control unit 101 may perform processing specified by the NFC digital protocol of the NFC standard, between S701 and S702.

Status Data Exchange Processing

Figure 8:
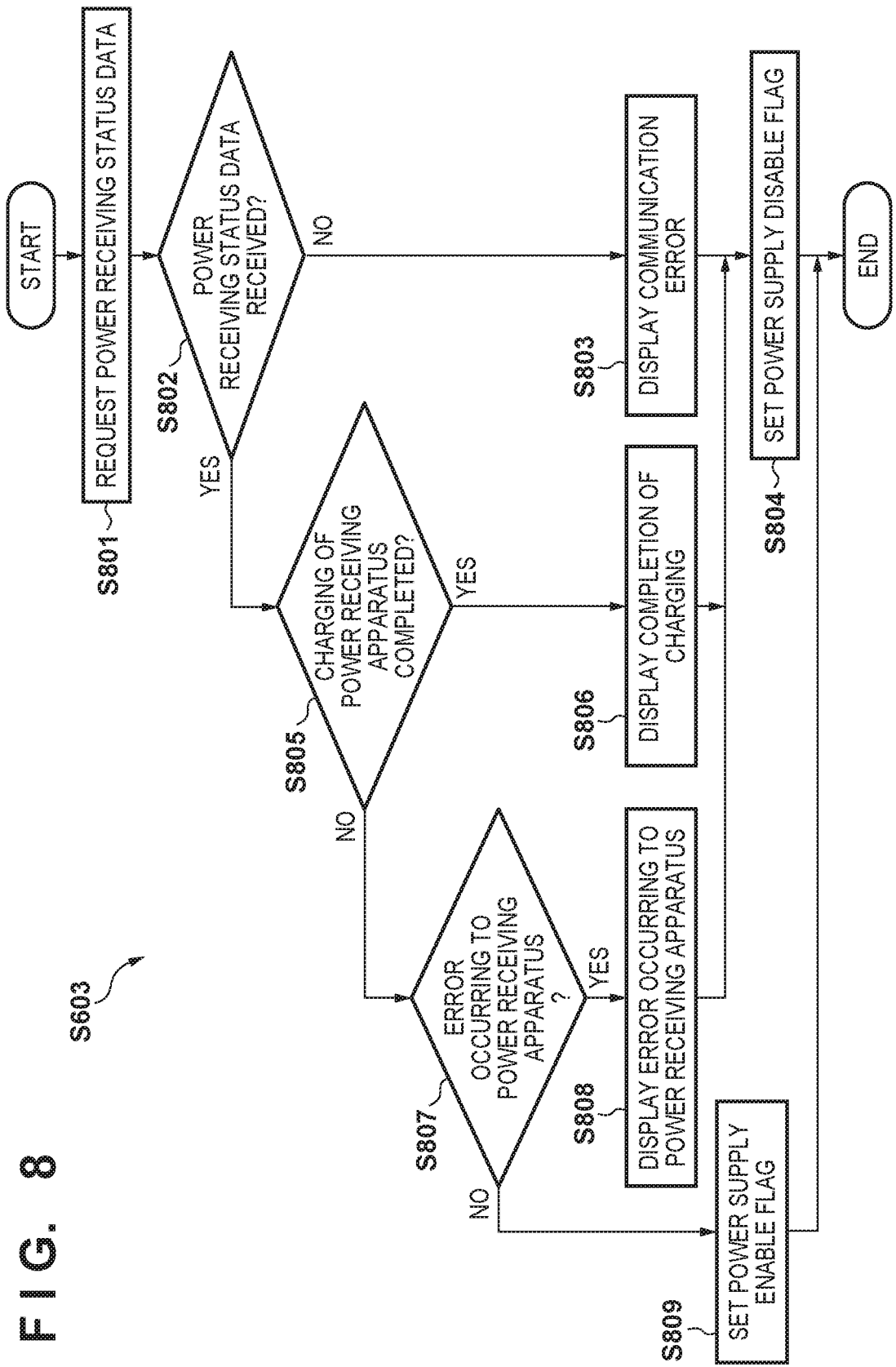
FIG. 8 is a flowchart showing an example of status data exchange processing performed by the power supply apparatus.

Next, the status data exchange processing performed by the control unit 101 in S603 of FIG. 6 according to the embodiment is described, with reference to the flowchart shown in FIG. 8. The status data exchange processing can be achieved by the control unit 101 executing the computer program stored in the memory 108.

In S801, the control unit 101 performs control to cause the first communication unit 106 to transmit data for requesting the transmission of the power receiving status data. Then, in S802, the control unit 101 determines whether or not the first communication unit 106 has received the power receiving status data from the power receiving apparatus 200 before a fixed period has elapsed since the transmission of the request of the power receiving status data to the power receiving apparatus 200. If it is determined, that the first communication unit 106 has not received the power receiving status data from the power receiving apparatus 200 even after the fixed period has elapsed since the transmission of the request of the power receiving status data (NO in S802), the control unit 101 proceeds to S803.

In S803, the control unit 101 causes the display unit 109 to display data indicating the communication error is detected, as in S706. Then, in S804, the control unit 101 sets the power supply disable flag in the memory 108. After this, the status data exchange processing is ended and the control unit 101 proceeds to S604 in FIG. 6.

On the other hand, if it is determined that the first communication unit 106 has received the power supply status data from the power receiving apparatus 200 (YES in S802), the control unit 101 proceeds to S805. In S805, the control unit 101 determines, based on the power supply status data received by the first communication unit 106, whether or not charging of the power receiving apparatus 200 is completed. If it is determined that charging of the power receiving apparatus 200 is completed (YES in S805), the control unit 101 proceeds to S806. In S806, the control unit 101 causes the display unit 109 display data indicating that charging of the power receiving apparatus 200 is completed. Moreover, the control unit 101 may also cause the display unit 109 to display data indicating that the battery 211 is fully charged. After this, in S804, the control unit 101 sets the power supply disable flag in the memory 108 and then ends the status data exchange processing.

On the other hand, if it is determined that charging of the power receiving apparatus 200 is not completed (NO in S805), the control unit 101 proceeds to S807. In S807, the control unit 101 determines, based on the power receiving status data received by the first communication unit 106, whether or not an error is occurring to the power receiving apparatus 200. For example, the control unit 101 determines whether or not the error is occurring to the power receiving apparatus 200 by detecting error data from the power receiving status data of the power receiving apparatus 200 and analyzing the error data.

If it is determined that the error is occurring to the power receiving apparatus 200 (YES in S807), the control unit 101 proceeds to S808. In S808, the control unit 101 causes the display unit 109 to display data indicating that the error is occurring to the power receiving apparatus 200. Moreover, the control unit 101 may also cause the display unit 109 to display data indicating the type of the error occurring to the power receiving apparatus 200. After this, the control unit 101 sets the power supply disable flag in the memory 108 in S804, and then ends the status data exchange processing.

If it is determined that no error is occurring to the power receiving apparatus 200 in S807 (NO in S807), the control unit 101 proceeds to S809. In S809, the control unit 101 sets the power supply enable flag in the memory 108. After the execution of S809, the status data exchange processing is ended and then the control unit 101 proceeds to S604 in FIG. 6.

Foreign Object Detection Processing—Polling

Figure 9:
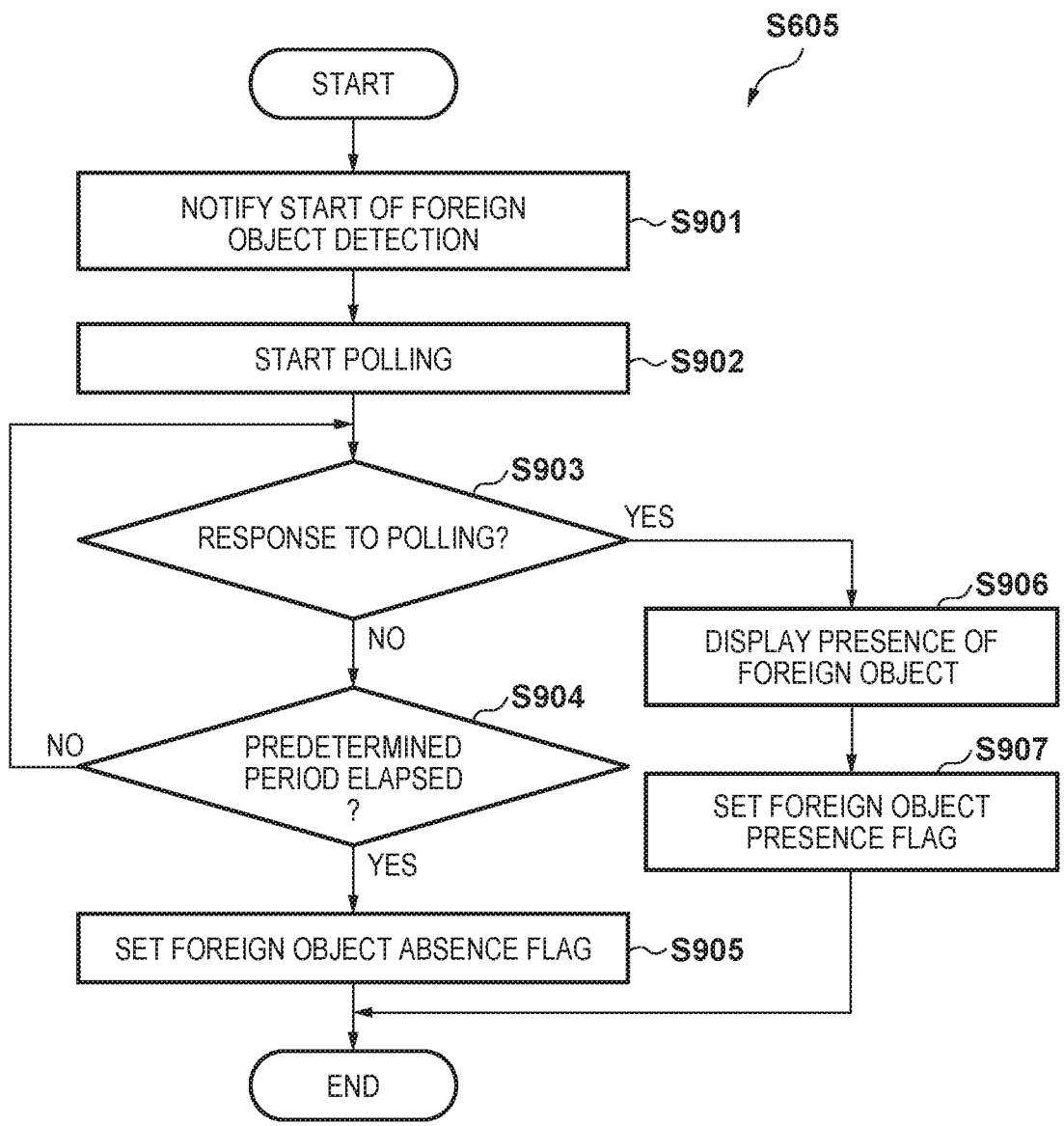
FIG. 9 is a flowchart showing an example of power supply processing performed by the power supply apparatus.

Next, foreign object detection processing performed by the control unit 101 in S605 of FIG. 6 according to the embodiment is described, with reference to the flowchart shown in FIG. 9. The foreign object detection processing can be achieved by the control unit 101 executing the computer program stored in the memory 108.

In S901, the control unit 101 performs control to cause the first communication unit 106 to transmit data notifying the power receiving apparatus 200 of the start of foreign object detection. Then, in S902, the control unit 101 performs control to cause the first communication unit 106 to transmit a polling command to detect the presence or absence of an electronic apparatus capable of communicating with the first communication unit 106. Moreover, in S902, the control unit 101 performs control to cause the timer 121 to count the time elapsed since the start of transmission of the polling command.

For the polling command transmitted in S902, communication parameters different from those of the polling command transmitted in S701 may be used. In S902, polling using the communication parameters different from those of the polling command transmitted in S701 can make it easy for the control unit 101 to detect a foreign object that could not be detected in polling performed in S701.

It should be noted that the communication parameters used when the polling command is transmitted include a carrier output level, a modulation method, and a modulation index, and so on of the first communication unit 106. For example, the control unit 101 performs control in S902 to cause the first communication unit 106 to execute polling at a carrier output level higher than the carrier output level in the transmission of the polling command in S701. Moreover, for example, the control unit 101 uses 10% ASK (Amplitude Shift Keying) for the modulation method and the modulation index of the polling command in S701 and uses 100% ASK for the modulation method and the modulation index of the polling command in S902. Furthermore, the control unit 101 uses ASK for the modulation method of the polling command in S701, and uses PSK (Phase Shift Keying) for the modulation method of the polling command in S902. In the polling in S902, these methods allow the control unit 101 to more easily detect the foreign object that could not be detected in polling performed in S701.

Next, in S903, the control unit 101 detects the presence or absence of a response received by the first communication unit 106 in response to the polling command. If it is determined that the first communication unit 106 has not received the response to the polling command (NO in S903), the control unit 101 proceeds to S904. In S904, the control unit 101 determines, based on the time counted by the timer 121, whether or not a predetermined period has elapsed since the start of transmission of the polling command. If the time counted by the timer 121 is not the predetermined period or more, the control unit 101 determines that the predetermined period has not elapsed since the start of transmission of the polling command (NO in S904). Thus, the control unit 101 returns to S903 and repeats the above process. It should be noted that the case of receiving the response to the polling command in S903 includes the case of detecting a tag of an electronic apparatus other than the power supply apparatus 100 in polling.

Here, the predetermined period refers to a foreign object detection processing period shared by the power supply apparatus 100 and the power receiving apparatus 200. The power supply apparatus 100 and the power receiving apparatus 200 may use a predetermined foreign object detection period. Alternatively, the power supply apparatus 100 may transmit, in S901, data indicating a foreign object detection period together with the data notifying the power receiving apparatus 200 of the start of foreign object detection.

If it is determined that the time counted by the timer 121 is the predetermined period or more (YES in S904), the control unit 101 determines that the predetermined period has elapsed since the start of transmission of the polling command and thus proceeds to S905. In S905, the control unit 101 sets a foreign object absence flag in the memory 108. Then, the foreign object detection processing is ended, and the control unit 101 proceeds to S606 in FIG. 6.

If it is determined that the first communication unit 106 has received the response to the polling command (YES in S903), the control unit 101 proceeds to S906. In S906, the control unit 101 causes the display unit 109 to display, as a warning, data indicating that the foreign object is detected near the power supply apparatus 100. Then, in S907, the control unit 101 sets a foreign object presence flag in the memory 108. In this way, the foreign object detection processing is ended and the control unit 101 proceeds to S606 in FIG. 6.

It should be noted that the foreign object detection processing (S605) performed by the power supply apparatus 100 is not limited to the processing performed using the polling command described with reference to FIG. 9. Electric power may be transmitted from the power supply antenna 107 using the communication power during the foreign object detection processing and, based on a signal obtained from the power supply antenna 107 by this power transmission, the foreign object detection may be performed. This operation may be performed in addition to or instead of the processing using the polling command. For example, the detection unit 104 may detect the VSWR (Voltage Standing Wave Ratio) indicating the resonant condition between the power supply apparatus 100 and the power receiving apparatus 200. Then, whether or not the VSWR changes by a predetermined value or more may be detected. In this case, if the VSWR changes by the predetermined value or more, the control unit 101 determines that the foreign object is present and thus does not execute the power supply processing. Moreover, the control unit 101 may determine the presence or absence of a foreign object by detecting whether or not the current detected by the current detection unit 111 changes by a predetermined current value or more. In this case, if the current detected by the current detection unit 111 changes by the predetermined current value or more, the control unit 101 determines that the foreign object is present and thus does not execute the power supply processing.

Furthermore, the control unit 101 may determine the presence or absence of a foreign object by detecting whether or not the temperature detected by the temperature detection unit 112 changes by a predetermined temperature value or more. The presence of a foreign object can be determined by detection of heat generated from the foreign object in response to the power transmission from the power supply antenna 107 in the foreign object detection processing. In this case, if the temperature detected by the temperature detection unit 112 changes by the predetermined temperature value or more, the control unit 101 determines that the foreign object is present and thus does not execute the power supply processing.

Power Supply Processing

Figure 10:
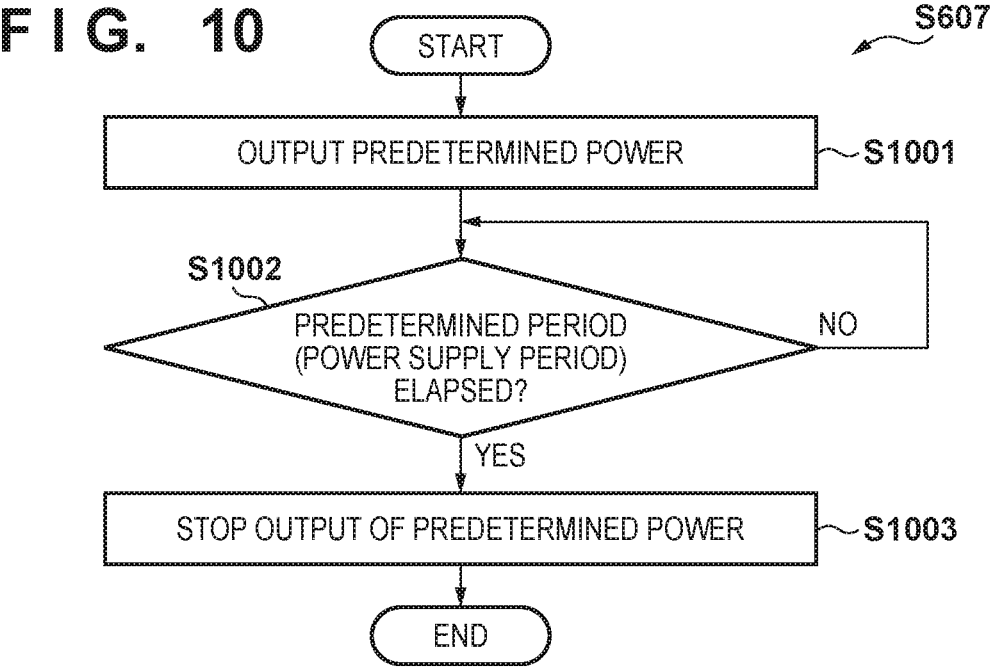
FIG. 10 is a flowchart showing an example of foreign object detection processing performed by the power supply apparatus.

Next, power supply processing performed by the control unit 101 in S607 of FIG. 6 is described, with reference to the flowchart shown in FIG. 10, The power supply processing can be achieved by the control unit 101 executing the computer program stored in the memory 108.

In S1001, the control unit 101 performs control to cause the power supply unit 102 to output the predetermined power. Moreover, the control unit 101 performs control to cause the timer 121 to count the time elapsed since the output of the predetermined power. Then, in S1002, the control unit 101 determines, based on the time counted by the timer 121, whether or not the predetermined period (the power supply period) has elapsed since the output of the predetermined power. If the time counted by the timer 121 is not the predetermined period or more, the control unit 101 determines that the predetermined period has not elapsed since the output of the predetermined power (NO in S1002). Thus, the control unit 101 returns to S902.

If the time counted by the timer 121 is the power supply period or more, the control unit 101 determines that the power supply period has elapsed since the output of the predetermined power (YES in S1002) and thus proceeds to S1003. In S1003, the control unit 101 performs control to cause the power supply unit 102 to stop the output of the predetermined power. In this way, the power supply processing (S607) is ended, and the control unit 101 proceeds to S608 in FIG. 6.

Flow of Electronic Apparatus

Figure 11:
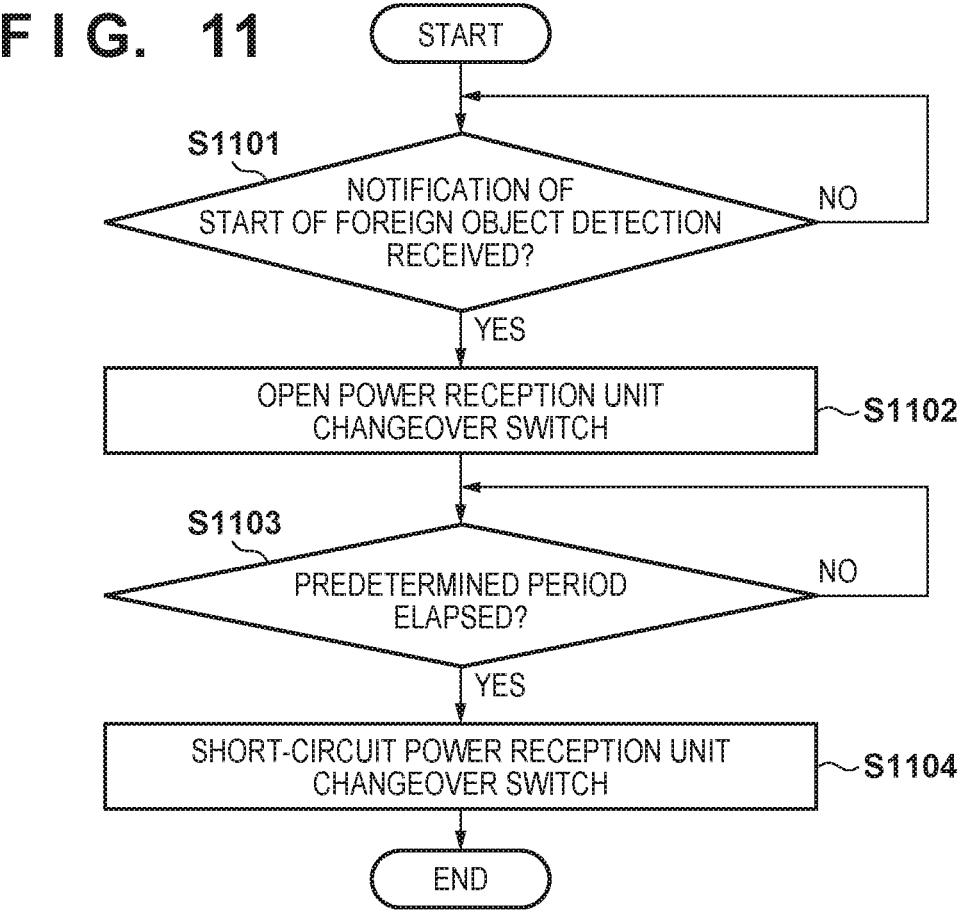
FIG. 11 is a flowchart showing an example of foreign object detection processing performed by the electronic apparatus.

Next, power receiving processing performed by the power receiving apparatus 200 according to the present embodiment is described, with reference to the flowchart shown in FIG. 11. The power supply receiving processing can be achieved by the control unit 201 executing the computer program stored in the memory 213. It should be noted that the processing shown in FIG. 11 is started when the power supply apparatus 100 and the power receiving apparatus 200 enter the foreign object detection state (state 504 in FIG. 5).

In S1101, the control unit 201 controls the first communication unit 206 to determine whether or not the foreign object detection start data has been received from the power supply apparatus 100. If it is determined that the foreign object detection start data has not been received (NO in S1101), the control unit 201 returns to S1101. In this way, the control unit 201 waits for the foreign object detection start data to be received.

If it is determined that the foreign object detection start data has been received (YES in S1101), the control unit 201 proceeds to S1102. In S1102, the control unit 201 opens the power reception unit changeover switch 220 to separate the power receiving antenna 203 from the circuits including the matching circuit 204 and the circuits located downstream of the matching circuit 204 on the power receiving side. As a result of this, the impedance of the power receiving apparatus 200 becomes infinite for the power supply apparatus 100. Thus, the power receiving apparatus 200 seems not to exist to the power supply apparatus 100.

Next, in S1103, the control unit 201 determines whether or not a predetermined period has elapsed since the reception of the foreign object detection start data. If the predetermined period has not elapsed yet (NO in S1103), the control unit 201 returns to S1103 and keeps the power reception unit changeover switch 220 open until the elapse of the predetermined period, Here, the predetermined period refers to the foreign object detection processing period shared by the power supply apparatus 100 and the power receiving apparatus 200. The power supply apparatus 100 and the power receiving apparatus 200 may use a predetermined foreign object detection period. Alternatively, the power receiving apparatus 200 may receive, in S1101, data indicating a foreign object detection period together with the data notifying the start of foreign object detection from the power supply apparatus 100.

If it is determined that the predetermined period has elapsed (YES in S1103), the control unit 201 proceeds to S1104. In S1104, the control unit 201 returns the power reception unit changeover switch 220 back to short-circuit condition. In this way, the power supply processing performed by the power receiving apparatus 200 is ended.

The power reception unit changeover switch 220 is located between the power receiving antenna and the matching circuit according to the present embodiment. However, the position of the power reception unit changeover switch 220 is not limited to this. For example, the power reception unit changeover switch 220 may be located at an arbitrary position between the power receiving antenna 203 and the load section 209 consuming the power received from the power receiving antenna 203. For instance, the power reception unit changeover switch 220 may be located between the rectifier smoothing circuit 205 and the power detection unit 207.

With the wireless power supply system 10 according to the present embodiment described thus far, the power reception unit changeover switch 220 of the power receiving apparatus 200 is opened when the power supply apparatus 100 performs the foreign object detection processing before the start of power supply. As a result, the impedance of the power receiving apparatus 200 becomes infinite for the power supply apparatus 100 and thus the power receiving apparatus 200 seems not to exist. This allows the power supply apparatus 100 to more easily detect a foreign object that is not a power transfer target.

In the embodiment, the power supply apparatus 100 supplies the predetermined power to the power receiving apparatus 200 via the power supply antenna 107, and communication between the first communication unit 106 and the power receiving apparatus 200 is established via the power supply antenna 107. However, this is not intended to be limiting. For example, the power supply apparatus 100 may include an antenna used for supplying the predetermined power to the power receiving apparatus 200 and another antenna used for establishing communication between the first communication unit 106 and the power receiving apparatus 200.

Moreover, the power receiving apparatus 200 receives power from the power supply apparatus 100 via the power receiving antenna 203, and communication between the power supply apparatus 100 and the first communication unit 206 is established via the power receiving antenna 203. However, this is not intended to be limiting. For example, the power receiving apparatus 200 may include an antenna used for receiving power from the power supply apparatus 100 and another antenna used for establishing communication between the power supply apparatus 100 and the first communication unit 206.

Furthermore, the first communication unit 106 is described as operating as the reader/writer specified in the NFC standard. However, this is not intended to be limiting. For example, the first communication unit 106 may operate as a P2P (Peer To Peer) specified in the NFC standard.

Other Embodiments

The power supply apparatus according to the present invention is not limited to the power supply apparatus 100 described in the embodiment. For example, the power supply apparatus according to the present invention may be implemented by a system including a plurality of apparatuses. Moreover, the electronic apparatus according to the present invention is not limited to the power receiving apparatus 200 described in the embodiment. For example, the electronic apparatus according to the present invention may be implemented by a system including a plurality of apparatuses.

Moreover, the various processes and functions described in the embodiment can also be implemented by computer programs. In this case, the processes according to the present invention can be executed by the computer programs to achieve the various functions described in the embodiment. It should be obvious that the computer programs according to the present invention may achieve the various processes and functions described in the embodiment using, for example, an OS (Operating System) that runs on a computer.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-203701, filed Oct. 20, 2017, which is hereby incorporated by reference herein in its entirety.

What is claimed is:

1. An electronic apparatus that includes:
an antenna;
at least one processor that operates to:
transmit a first polling;
authenticate, after a power-supply target electronic apparatus is detected through the first polling, for the power-supply target electronic apparatus;
provide, after the power-supply target electronic apparatus is authenticated, a notification to notify the power-supply target electronic apparatus of a start of foreign object detection processing;
execute, after the notification is provided, the foreign object detection processing to detect a presence of a foreign object that is not a power supply target through a second polling performed for a predetermined period; and
control power supply from the antenna to the power-supply target electronic apparatus in a non-contacting manner, based on a result of the foreign object detection processing.

2. The electronic apparatus according to claim 1, wherein the at least one processor operates to determine that the foreign object is detected in the foreign object detection processing if a response to the second polling is detected.

3. The electronic apparatus according to claim 1, wherein the at least one processor operates to transmit the first polling using a communication parameter different from that used for the second polling.

4. The electronic apparatus according to claim 3, wherein the at least one processor operates to use the communication parameter includes at least one of a carrier output level, a modulation method, and a modulation index for the first polling.

5. The electronic apparatus according to claim 1, wherein if the foreign object that is not the power supply target is detected in the foreign object detection processing, the at least one processor operates to restrict a power supply output from the antenna.

6. The electronic apparatus according to claim 5, wherein if the foreign object that is not the power supply target is detected in the foreign object detection processing, the at least one processor operates to inhibit the power supply output from the power supply unit.

7. The electronic apparatus according to claim 1, further comprising
a display unit,
wherein if the foreign object that is not the power supply target is detected in the foreign object detection processing, the at least one processor operates to cause the display unit to display that the foreign object is detected.

8. The electronic apparatus according to claim 1, wherein the at least one processor operates to perform communication using NFC (Near Field Communication) via the antenna.

9. The electronic apparatus according to claim 1, wherein the at least one processor operates not to start power supply before the foreign object detection processing is performed.

10. The electronic apparatus according to claim 1, wherein the at least one processor operates to transmit the second polling during the predetermined period which is a period during which the power-supply target electronic apparatus opens an antenna in response to the notification.

11. The electronic apparatus according to claim 1, wherein the at least one processor operates to detect the presence of the foreign object by further detecting a change in a voltage standing wave ratio of the antenna for wireless power transfer; a change in a value of current passing through the antenna; or external heat generation.

12. A control method of an electronic apparatus that includes an antenna,
the control method comprising:
authenticating, after a power-supply target electronic apparatus is detected through a first polling, for the power-supply target electronic apparatus;
notifying, when the power-supply target electronic apparatus is authenticated, the power-supply target electronic apparatus of a start of foreign object detection processing;
executing, after the notifying, the foreign object detection processing to detect a presence of a foreign object that is not a power supply target through a second polling performed for a predetermined period; and
controlling power supply from the antenna to the power-supply target electronic apparatus in a non-contacting manner, based on a result of the foreign object detection processing.

13. A non-transitory computer-readable storage medium storing a computer program for causing a computer to execute a control method of an electronic apparatus that includes an antenna,
the control method comprising:
authenticating, after a power-supply target electronic apparatus is detected through a first polling, for the power-supply target electronic apparatus;
notifying, when the power-supply target electronic apparatus is authenticated, the power-supply target electronic apparatus of a start of foreign object detection processing;
executing, after the notifying, the foreign object detection processing to detect a presence of a foreign object that is not a power supply target through a second polling performed for a predetermined period; and
controlling power supply from the antenna to the power-supply target electronic apparatus in a non-contacting manner, based on a result of the foreign object detection processing.

* * * * *